D. STARKEY.
Device for Hitching Horses.
No. 204,458.  Patented June 4, 1878.
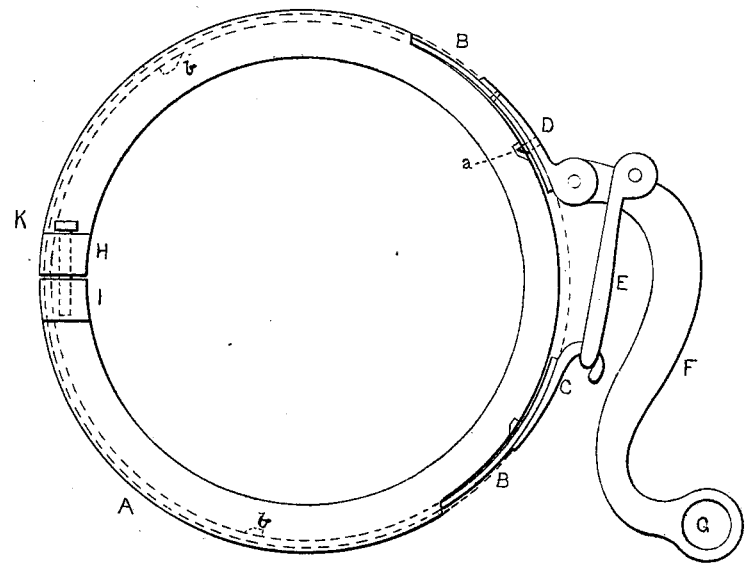
Witnesses;
M. S. Jenkins.
W. H. Ames
Inventor;
Dexter Starkey
Per Chas. D. Moore
Atty

UNITED STATES PATENT OFFICE.

DEXTER STARKEY, OF LAWRENCE, MASSACHUSETTS, ASSIGNOR OF TWO THIRDS HIS RIGHT TO RUFUS W. WHEELOCK AND GEO. B. TRICKEY, OF SAME PLACE.

IMPROVEMENT IN DEVICES FOR HITCHING HORSES.

Specification forming part of Letters Patent No. 204,458, dated June 4, 1878; application filed January 19, 1878.

*To all whom it may concern:*

Be it known that I, DEXTER STARKEY, of Lawrence, in the county of Essex and Commonwealth of Massachusetts, have invented certain new and useful Improvements in Devices for Hitching Horses; and that the following is a full, clear, and exact description thereof.

In the drawing, the letter A represents a band designed to be clamped to the hub of a carriage or wagon wheel, either on the inside or outside; B, a friction-spring passing around the band A, and kept thereon by flanges; C, a hook attached to one end of the spring B; D, a hinge-joint attached to the other end of the spring B; E, a link connecting the hook C and cam-lever F by a hinge-joint; F, a cam-lever hinged to D and the link E, and designed to tighten the spring B about the band A; G, an eye or ring to which it is designed to hitch the driving-reins; H and I, two projecting bosses from the band, through which passes the bolt or screw K, and designed with the bolt to clamp the band A to a hub of a wagon; K, a bolt or screw; $a$, a latch designed to aid the friction of the spring B by engaging the ratchets $b$, and $b$ ratchets designed to receive the latch $a$.

In carrying out my invention, the same being clamped to a wagon-wheel, when it is desired to hitch a horse, fasten the driving-reins to the eye G. Should the horse start, the lever F is forced up, drawing with it the link E and hook C, which binds the friction-spring B about the band A, and winds the reins about the hub of a wheel, thus checking the onward course of the horse. Should the horse back, the friction is immediately relieved, and the band allowed to revolve freely within the spring.

I am aware that devices have been attached to a wagon or carriage wheel for the purpose described, as in patent to R. P. Minshall, April 7, 1874, No. 149,505; and I therefore make no claim thereto; but

I claim as my invention and desire to secure by Letters Patent—

The combination of the band A, the friction-spring B, the hook C, the hinge-joint D, the link E, the cam-lever F, the eye G, the clamp H and I, the bolt and screw K, the latch $a$, and ratchets $b$, in a manner substantially as described.

DEXTER STARKEY. [L. S.]

Witnesses:
G. B. TRICKEY,
CHAS. D. MOORE.